(12) United States Patent
Cheon et al.

(10) Patent No.: US 8,353,205 B2
(45) Date of Patent: *Jan. 15, 2013

(54) MEASURING APPARATUS WITH AE SENSOR, INSTALLING METHOD THEREOF, AND SET OF THE MEASURING APPARATUS

(75) Inventors: Dae-Sung Cheon, Daejeon (KR); Yong-Bok Jung, Daejeon (KR); Eui-Sub Park, Daejeon (KR); Chan Park, Daejeon (KR); Joong-Ho Synn, Daejeon (KR)

(73) Assignee: Korea Institute of Geoscience and Mineral Resources (Kigam), Daejeon (KR)

( * ) Notice: Subject to any disclaimer, the term of this patent is extended or adjusted under 35 U.S.C. 154(b) by 375 days.

This patent is subject to a terminal disclaimer.

(21) Appl. No.: 12/665,870

(22) PCT Filed: May 8, 2009

(86) PCT No.: PCT/KR2009/002423
§ 371 (c)(1),
(2), (4) Date: Mar. 1, 2010

(87) PCT Pub. No.: WO2009/136754
PCT Pub. Date: Nov. 12, 2009

(65) Prior Publication Data
US 2011/0219867 A1 Sep. 15, 2011

(30) Foreign Application Priority Data

May 9, 2008 (KR) .................. 10-2008-0043431

(51) Int. Cl.
*E21B 49/00* (2006.01)
*G01V 1/40* (2006.01)
(52) U.S. Cl. .................................... 73/152.58
(58) Field of Classification Search .............. 73/152.58
See application file for complete search history.

(56) References Cited

U.S. PATENT DOCUMENTS

| 8,019,558 B2 * | 9/2011 | Cheon et al. ................. 702/35 |
| 2008/0278319 A1 * | 11/2008 | Meiksin et al. ............. 340/540 |
| 2010/0206078 A1 * | 8/2010 | Cheon et al. ................. 73/587 |

FOREIGN PATENT DOCUMENTS

| EP | 1 484 607 A1 | 12/2004 |
| JP | 05296983 A * | 11/1993 |
| JP | 08-062337 A | 3/1996 |
| JP | 09138223 A * | 5/1997 |
| WO | 89/05199 A1 | 6/1989 |
| WO | 89/12528 A1 | 12/1989 |

* cited by examiner

*Primary Examiner* — John Fitzgerald
(74) *Attorney, Agent, or Firm* — The Webb Law Firm (57) ABSTRACT

Provided is a measuring apparatus with AE sensors, which detects the same AE signals with respect to the same events that damage a geotechnical structure, regardless of ground conditions and formations in the geotechnical structure, thereby collecting reliable AE signals. Also, provided is(are) an installing method of the measuring apparatus with the AE sensor, and a set of the measuring apparatus with the AE sensor.

10 Claims, 9 Drawing Sheets

MEASURING APPARATUS WITH AE SENSOR, INSTALLING METHOD THEREOF, AND SET OF THE MEASURING APPARATUS

CROSS-REFERENCE(S) TO RELATED APPLICATIONS

The present invention claims priority of Korean Patent Application No. 10-2008-0043431, filed on May 9, 2008, which is incorporated herein by reference.

BACKGROUND OF THE INVENTION

1. Field of the Invention

The present invention relates to a measuring apparatus with an AE (Acoustic Emission) sensor; and, particularly, to a measuring apparatus with AE sensors, which detects the same AE signals with respect to the same events that damage a geotechnical structure, regardless of conditions and shapes of the ground in the geotechnical structure, thereby collecting reliable AE signals.

Further, the present invention relates to an installing method of the measuring apparatus with the AE sensor, and a set of the measuring apparatus with the AE sensor.

2. Description of Related Art

The present invention relates to a technology relevant to the field of rock mechanics and geotechnical engineering, particularly, a measurement technology for grasping failure signs of a geotechnical structure using Acoustic Emission (AE) signals generated by a damage of the geotechnical structure and also providing management standard for failure prediction. In detail, the present invention relates to a method of predicting failure of a geotechnical structure using the AE method instead of a conventional displacement or stress measuring method. Herein, the AE signal is an idea including AE and microseismic (MS) events.

AE is an elastic wave generated when energy of sudden strain relevant to damage of a material is emitted. Generally, generation of the AE signal is sharply increased before large-scale failure. As general technologies and equipments for predicting failure of a geotechnical structure, today, there is (are) a displacement measuring method using a rod extensometer, an inclinometer probe or GPS; a method of measuring a change in underground water level using a piezometer; and a stress measuring method using a load-meter. Since the strain before failure of a geotechnical structure is very small, it is difficult to grasp the failure signs using the conventional displacement or stress measuring method. However, before the failure of the geotechnical structure, microcracks are generated along with minute strain and then the microcracks are grown and coalesced with each other, whereby the failure occurs finally. Therefore, if it is possible to detect the microcracks, it is possible to grasp the signs of failure. In other words, before the final failure, the microcracks are generated in the geotechnical structure, and the microcracks cannot be detected by the displacement or stress but can be detected by the AE signals.

In a conventional measuring apparatus using the AE signals, a borehole was formed in the geotechnical structure, and a plurality of AE sensors is located at predetermined positions of the borehole along with a grouting material so as to measure the AE signals. The conventional measuring apparatus used as the grouting material a material having dynamic properties similar to those in a material of the geotechnical structure. However, since the geotechnical structure was comprised of various rocks and soils, it was difficult to use the same material as the material of the geotechnical structure.

Further, there was another problem that the plurality of AE sensors were needed due to attenuation characteristics of the AE signals.

In other words, the geotechnical structure is comprised of various rocks and soils, which respectively have different dynamic and technologic characteristics according to their kinds and conditions. Therefore, even though the same damages are applied to the geotechnical structure, the AE signals generated by the damages are different according to the geotechnical structures. Thus, the AE sensor for sensing the AE signals senses the different AE signals with respect to the same events that damage the geotechnical structure, and it is difficult to consistently predict the failure of the geotechnical structure.

SUMMARY OF THE INVENTION

An embodiment of the present invention is directed to providing a measuring apparatus with an AE sensor, which can collect reliable AE signals generated at a failure plane without influence of ground conditions and formations in the geotechnical structure.

Another embodiment of the present invention is directed to providing a measuring apparatus with an AE sensor, which can reduce attenuation characteristics of the AE signals in a waveguide that functions as a transfer medium for guiding the AE signals to the AE sensor.

Another embodiment of the present invention is directed to providing an installing method of the measuring apparatus with the AE sensor, which can prevent the detection of the AE signals generated by shock from the ground, not damage of the geotechnical structure.

Another embodiment of the present invention is directed to providing a set of the measuring apparatus with the AE sensor, which can prevent voltage drop and crosstalk in each AE sensor and electric power noise generated when power is applied to the AE sensor, by using a new type circuit for applying the power to the AE sensor. Herein, the term "AE signal" includes both AE and microseismic (MS) events. The AE sensor includes a piezoelectric sensor and a high sensitivity accelerometer. In the present invention, a new type circuit is applied when the high sensitivity accelerometer is used as the AE sensor.

To achieve the object of the present invention, the present invention provides a measuring apparatus with an AE sensor, which is fixedly installed in a borehole passing through an expected failure plane in a geotechnical structure, including an inner waveguide which is formed of a metallic material so as to prevent sharp attenuation of an AE signal; at least one AE sensor which is attached to the inner waveguide; and an outer waveguide which encloses the inner waveguide and the at least one AE sensor, attached to an outer side of the inner waveguide and formed of a homogeneous brittle material so as to generate a specific AE signal according to a movement of the geotechnical structure regardless of ground conditions in the geotechnical structure when the outer waveguide is damaged by the movements of the geotechnical structure.

Preferably, the outer waveguide is formed of a material having a brittleness of 8 or more, and the outer waveguide is formed of cement, and the outer waveguide is a grouting material formed by injecting the cement into the borehole after the inner waveguide on which the at least one AE sensor is attached is inserted into the borehole.

Preferably, the at least one AE sensor is attached to the inner waveguide by using an adhesive couplant so that elastic waves are smoothly propagated.

The present invention provides an installing method of a measuring apparatus with an AE sensor, including an installing step of an inner waveguide wherein an inner waveguide, on which at least one AE sensor is attached and which is formed of a metallic material to prevent sharp attenuation of a AE signal, is inserted into a borehole passing through a failure prediction surface of a geotechnical structure, so that an outer end of the inner waveguide positioned at an entrance of the borehole is inserted at a desired depth from an entrance of the borehole; a grouting step wherein cement is grouted in a space between the inner waveguide and the borehole, being grouted onto an upper end of the inner waveguide, so as to generate a specific AE signal according to a movement of the geotechnical structure regardless of conditions of the ground in the geotechnical structure when the cement, which is attached to an outer side of the inner waveguide, is damaged by the movement of the geotechnical structure; and a filling step of an attenuating material wherein an attenuating material is filled from an upper side of the cement to the entrance of the borehole.

Preferably, the installing step of an inner waveguide is performed by loosening a string which is formed of a non-metallic material and connected with the outer end of the inner waveguide, and the installing step of an inner waveguide is performed so that the AE sensors are respectively positioned at a different place while the expected failure plane is interposed between the AE sensors, and the attenuating material is sand.

The present invention provides a set of the measuring apparatus with the AE sensor, including an AE/MS controller which supplies power to each AE sensor and also functions to receive the AE signals collected by each AE sensor and then measure, store and process them; an external power supply unit which supplies power to the AE/MS controller; and a data server which is connected with the AE/MS controller.

Preferably, the AE/MS controller comprises a signal conditioner which functions to supply the power to each AE sensor and also to receive AE signals from the AE sensor, wherein the signal conditioner comprises a noise filtering circuit for removing power noise generated when the power is supplied to each AE sensor; a resistor row, a condenser and a regulator which prevents voltage drop and crosstalk in each AE sensor.

DETAILED DESCRIPTION OF MAIN ELEMENTS

| | |
|---|---|
| 110: inner wavelength | |
| 121: first AE sensor | 122: second AE sensor |
| 130: outer wavelength | 140: string |
| 150: attenuating material | 210: AE/MS controller |
| 212: signal conditioner | 214: DAQ board |
| 216: monitoring computer | |
| 220: external power supply unit | |
| 230: transmitter module | 240: receiver module |
| 250: data server | |

DESCRIPTION OF SPECIFIC EMBODIMENTS

The advantages, features and aspects of the invention will become apparent from the following description of the embodiments with reference to the accompanying drawings, which is set forth hereinafter.

First Embodiment

The first embodiment relates to a measuring apparatus with an AE (Acoustic emission) sensor in accordance with a first embodiment of the present invention.

Figure 1:
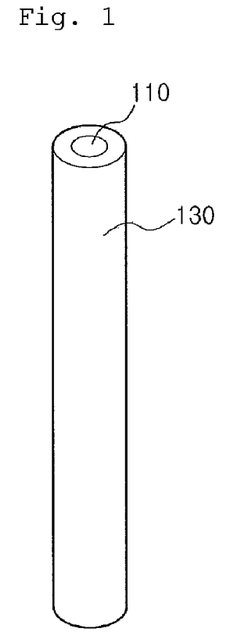
FIG. 1 is a perspective view of a first embodiment of the present invention.
Figure 2:
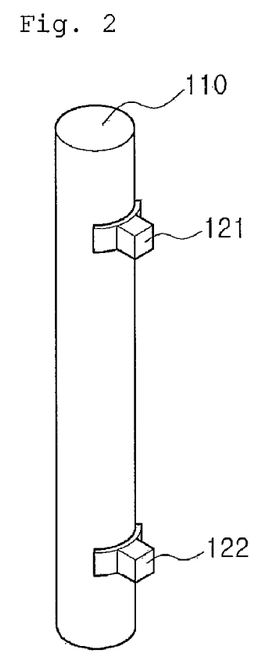
FIG. 2 is a perspective view of an inner waveguide in accordance with the first embodiment of the present invention.

Referring to FIGS. 1 and 2, a measuring apparatus with an AE sensor in the first embodiment of the present invention includes an inner waveguide 110, an AE sensor 121, 122, and an outer waveguide 130.

Referring to FIG. 2, the inner guide 110 may be formed into a straight cylindrical shape. The inner waveguide 110 is formed of a metal material so as to prevent attenuation of elastic waves.

Referring to FIG. 2, at least one AE sensor is provided at the inner waveguide 110, and the first and second AE sensors 121 and 122 may be provided. The AE signal is an idea including AE and microseismic (MS) events. The first and second AE sensors 121 and 122 are attached to the inner waveguide 110 by using an adhesive couplant so that the elastic waves are smoothly propagated. The first and second AE sensors 121 and 122 are attached in a length direction of the inner waveguide 110 so as to be spaced apart from each other. In the first embodiment, when the measuring apparatus of the first embodiment is inserted into a borehole passing through a failure prediction surface of a geotechnical structure, the first and second AE sensors 121 and 122 may be positioned at a different area from each other on the basis of the expected failure plane. The first and second AE sensors 121 and 122 are a piezoelectric sensor or a high sensitivity accelerometer. A failure plane generated by sliding from an inclined plane or tensile crack can be predicted through a previous analysis like a computer analysis, and this is called as 'expected failure plane'.

Referring to FIG. 1, the outer waveguide 130 is attached to an outer surface of the inner waveguide 110. The outer waveguide 130 is attached so as to enclose the inner waveguide 110 as well as the first and second AE sensors 121 and 122 attached to the inner waveguide 110. The outer waveguide 130 is formed of a homogeneous brittle material. The outer waveguide 130 may be formed of a material having a brittleness of 8 or more so as to be easily broken when an external shock is exerted from the geotechnical structure. Further, since the homogeneous material is used, the AE signals generated upon the damage of the outer waveguide 130 are the same as each other regardless of positions of the damage. Since cement has such features and is facilely attached to the outer surface of the inner waveguide 110 formed of a metallic material, the outer waveguide 130 may be formed of cement.

In case that the outer waveguide 130 is formed of cement, the outer waveguide 130 may be a grouting material formed by injecting the cement around the inner waveguide 110 after the inner waveguide 110 on which the first and second AE sensors 121 and 122 are attached is inserted into a borehole.

The ground constituting the geotechnical structure is comprised of various rocks and soils and thus the AE signals generated when the ground is damaged are not the same as each other. However, in case that the grouting material is inserted into the borehole, the grouting material is specifically damaged according to a specific movement or failure of the geotechnical structure and the AE signals generated by the specific damage of the grouting material may be regarded as being the same as each other. In other words, a part of a failed plane of the geotechnical structure is substituted with the homogenous grouting material, and thus the AE signals generated by the specific damage of the homogenous grouting material becomes the same as each other. Meanwhile, the AE signals generated from the outer waveguide 130 according to the specific movement of the geotechnical structure are arrived at the inner waveguide 110. That is, in case of the measuring apparatus with the AE sensor used in the first embodiment, the AE signals arrived at the inner waveguide 110 are not the AE signals generated from the geotechnical structure but the specific AE signals generated from the outer waveguide 130 according to the specific movement of the geotechnical structure.

In the measuring apparatus with the AE sensor used in the first embodiment as described above, the outer waveguide 130 formed of the brittle material is specifically damaged by force exerted by the specific movement of the geotechnical structure, and thus the specific AE signals are generated according to the force exerted by the specific movement of the geotechnical structure regardless of conditions of the geotechnical structure. Therefore, the measuring apparatus with the AE sensor used in the first embodiment precisely predicts the level of the damage and the failure of the geotechnical structure occurred by the specific events that damage the geotechnical structure. In other words, indoor tests such as compression, tensile or shear test are carried out with respect to the same equipment as the measuring apparatus with the AE sensor inserted into the borehole. Data of the AE signals obtained from these tests may be used as a standard for predicting the level of damage and the possibility of failure of the geotechnical structure without compensating or modifying of the data according to actual spot conditions.

Second Embodiment

Figure 3:
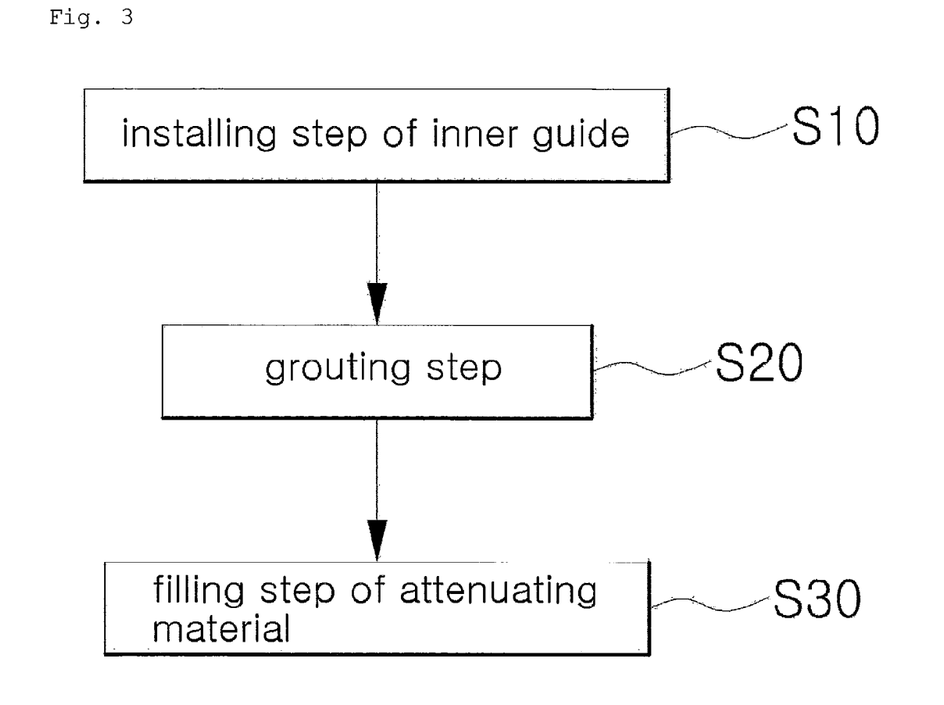
FIG. 3 is a flow chart of a second embodiment of the present invention.

The second embodiment relates to an installing method of the measuring apparatus with the AE sensor. FIG. 3 is a flow chart of a second embodiment of the present invention, FIG. 4 is a view showing an installing step of the inner waveguide in accordance with the second embodiment of the present invention, and FIG. 5 is a view showing a grouting step in accordance with the second embodiment of the present invention.

Referring to FIG. 3, the installing method of the measuring apparatus with the AE sensor includes an installing step S10 of an inner waveguide, a grouting step S20 and a filling step S30 of an attenuating material.

Figure 4:
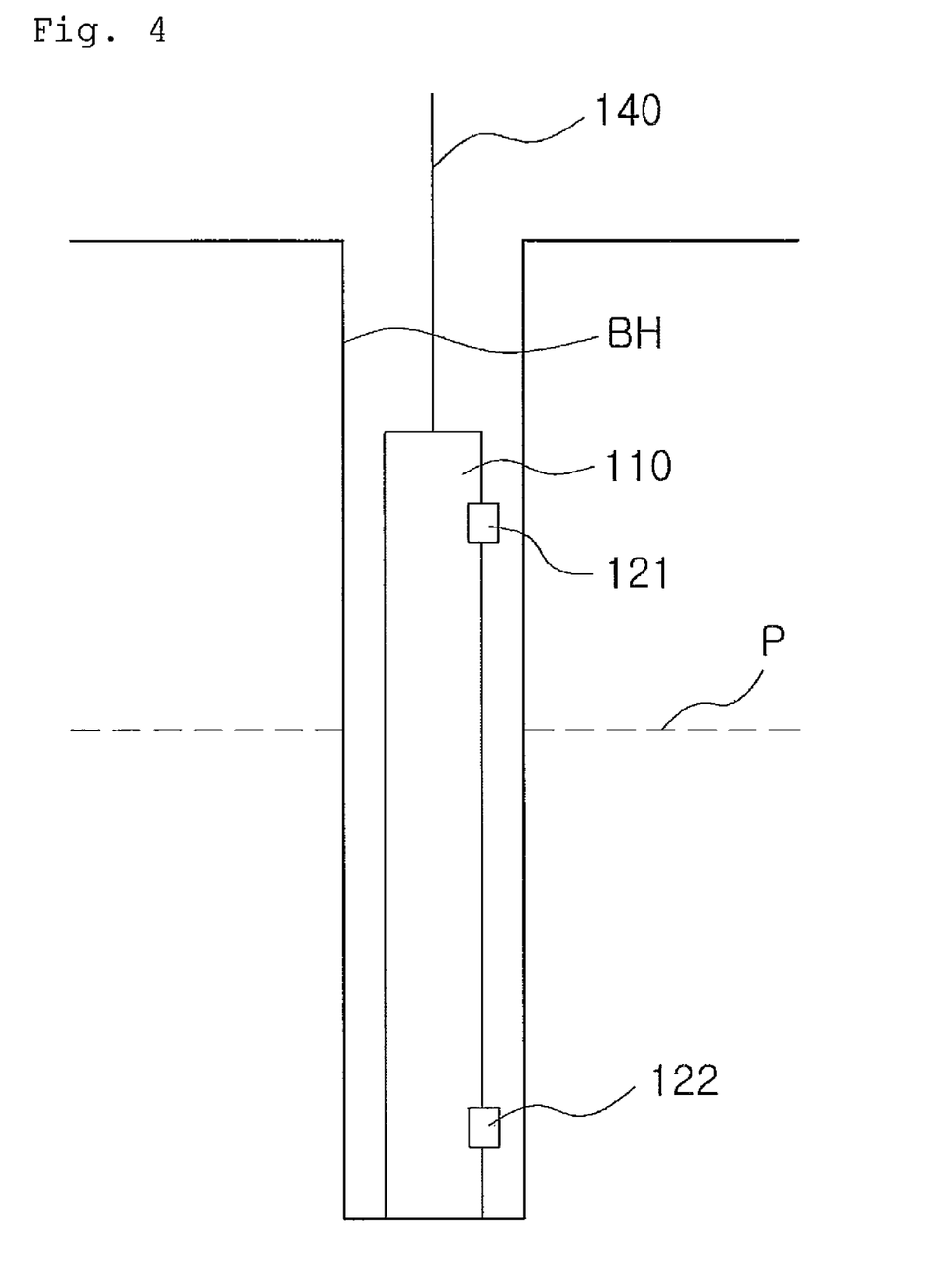
FIG. 4 is a view showing an installing step of the inner waveguide in accordance with the second embodiment of the present invention.
Figure 5:
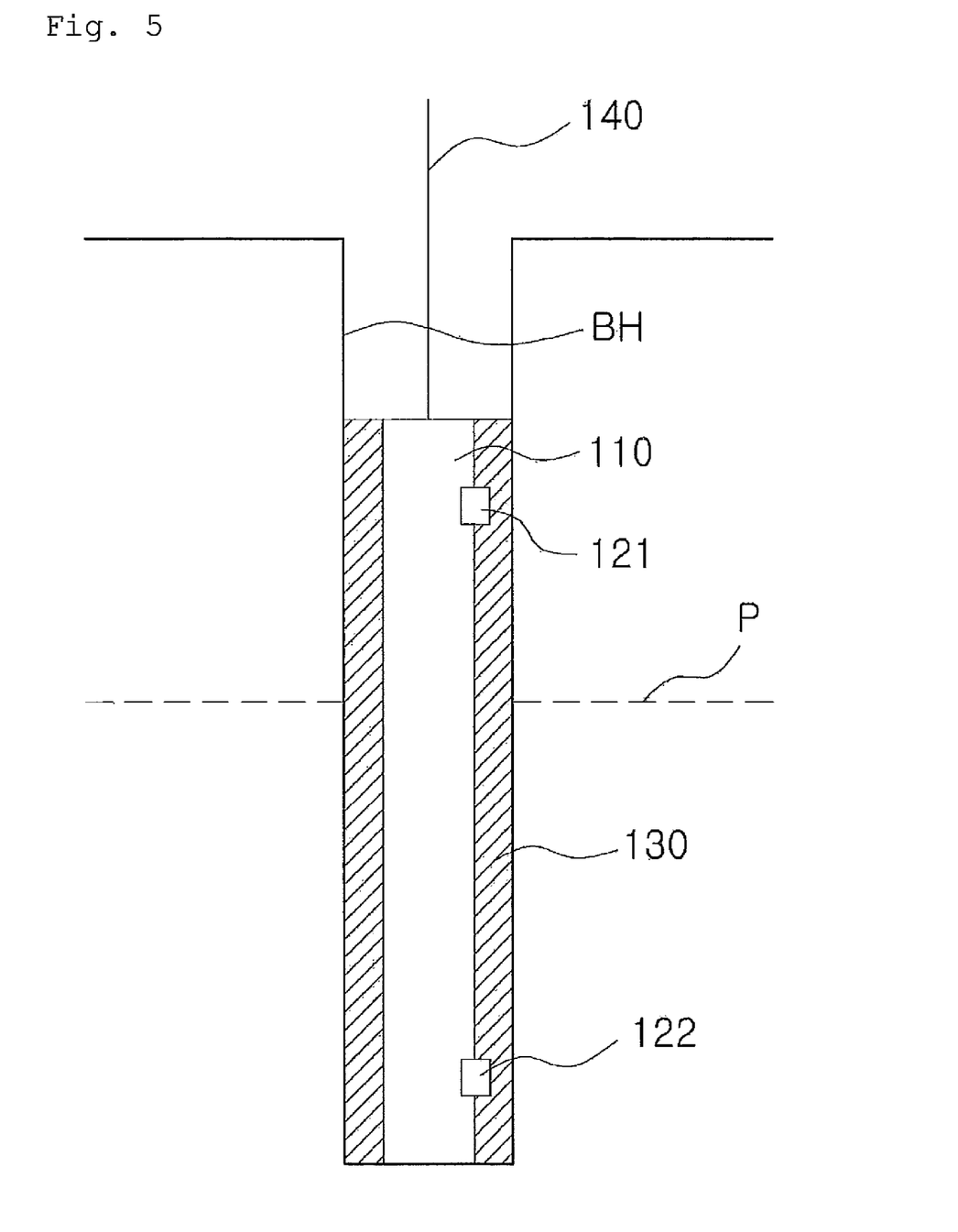
FIG. 5 is a view showing a grouting step in accordance with the second embodiment of the present invention.

Referring to FIG. 4, in the installing step S10 of the inner waveguide, the inner waveguide 110 on which the first and second AE sensors 121 and 122 are attached is inserted into the borehole formed at the geotechnical structure. The borehole is formed to pass through an expected failure plane P of the geotechnical structure.

Referring to FIG. 4, assuming that an end of the inner waveguide 110 positioned at an entrance of the borehole is called an outer end, the inner waveguide 110 is inserted into the borehole by slowly loosening a string 140 which is formed of a non-metallic material and connected with the outer end of the inner waveguide 110. The reason why the string 140 is formed of the non-metallic material is to prevent the first and second AE sensors 121 and 122 from detecting an AE signal generated by a shock from the ground.

Referring to FIG. 4, the outer end of the inner waveguide 110 is disposed to be inserted into the borehole at a desired depth from the entrance thereof. Therefore, a space is formed between the entrance of the borehole and the outer end of the inner waveguide 110. The space is filled with an attenuating material 150 so as to prevent shock waves from being transferred to the inner waveguide 110 from the ground.

Referring to FIG. 4, the inner waveguide 110 may be inserted into the borehole so that the first and second AE sensors 121 and 122 are respectively positioned at a different place while the expected failure plane P is interposed between the first and second AE sensors 121 and 122. For example, the first AE sensor 121 is positioned at an upper side of the expected failure plane P and the second AE sensor 122 is positioned at a lower side of the expected failure plane P.

Referring to FIG. 5, in the grouting step S20, the outer waveguide 130 is attached to the outer surface of the inner waveguide 110. The outer waveguide 130 is formed by grouting a space between the inner waveguide 110 and the borehole with cement. The cement grouting is formed to at least an upper end of the inner waveguide 110.

Figure 6:
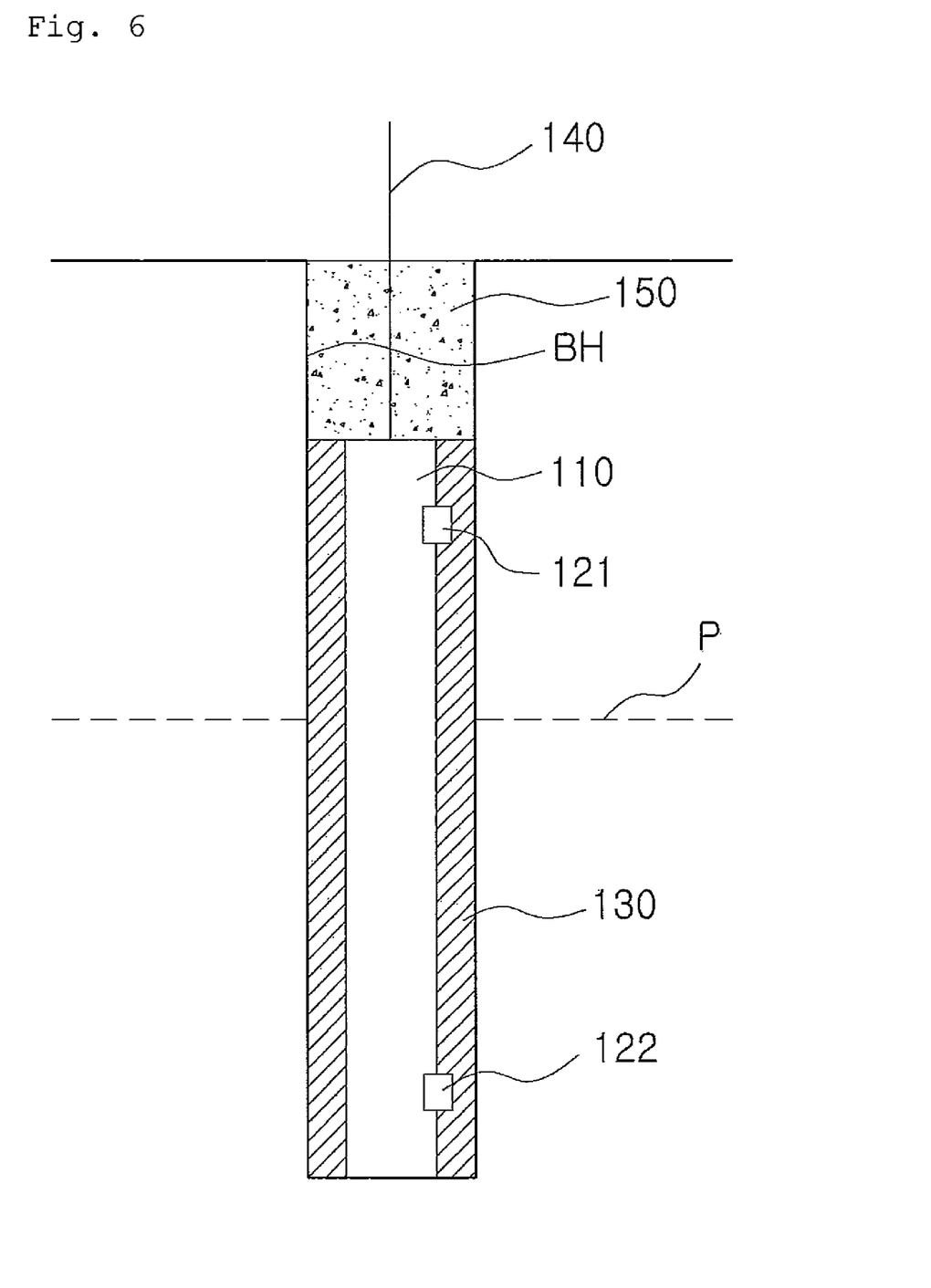
FIG. 6 is a view showing a filling step of an attenuating material in accordance with the second embodiment of the present invention.

Referring to FIG. 6, in the filling step S30 of the attenuating material, the attenuating material 150 is filled from the upper end of the outer waveguide 130 to the entrance of the borehole. The attenuating material 150 functions to prevent an AE signal generated by the external shock from being detected by the first and second AE sensors 121 and 122 through the inner waveguide 110. The attenuating material may be sand.

Although not shown in the drawings, the first AE sensor 121 is connected with a first signal line and the second AE sensor 122 is connected with a second signal line, and the first and second signal lines are connected to an outside through the entrance of the borehole.

Third Embodiment

Figure 7:
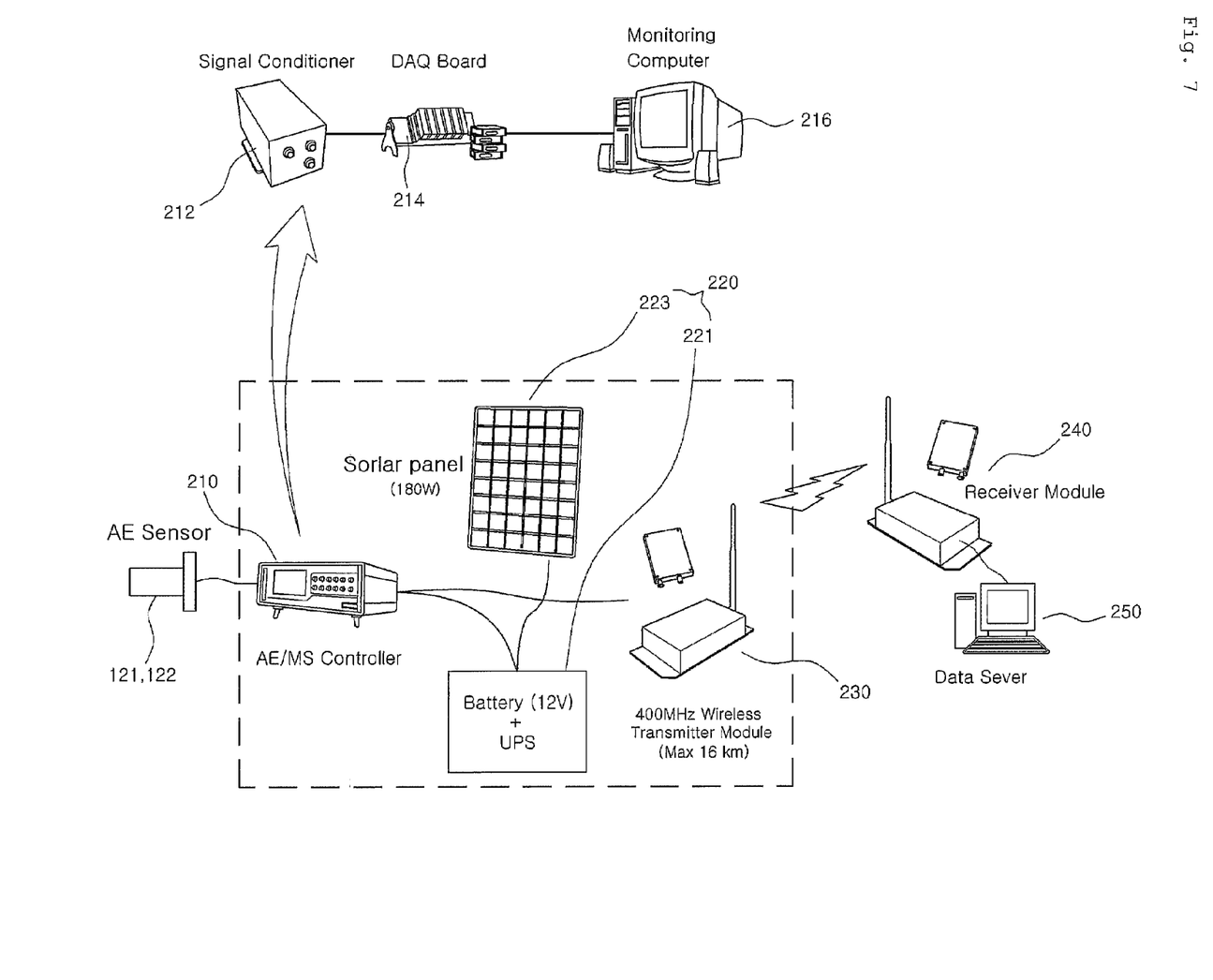
FIG. 7 is a schematic view showing a construction in accordance with a third embodiment of the present invention.
Figure 8:
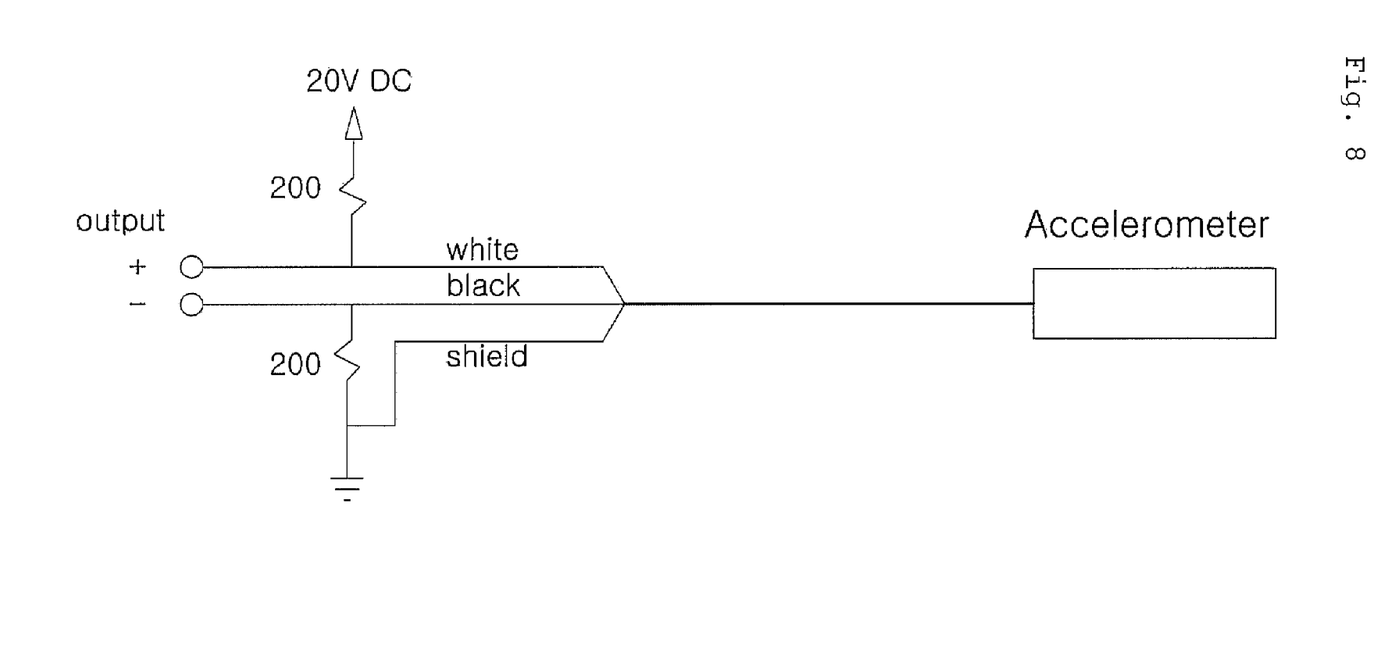
FIG. 8 is a circuit diagram showing a state that electric power is applied to an AE sensor.
Figure 9:
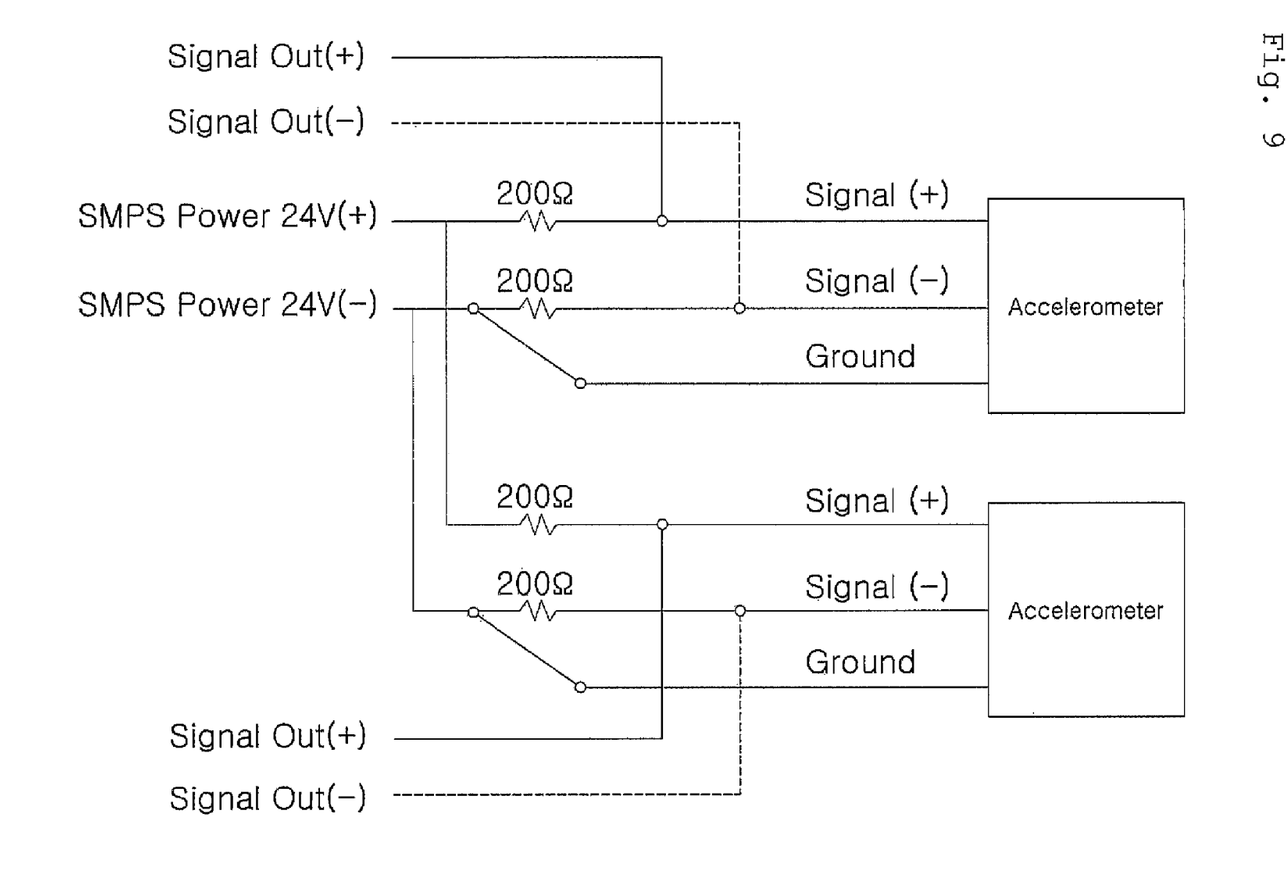
FIG. 9 is a conventional circuit diagram showing a state that electric power is applied to the AE sensor.
Figure 10:
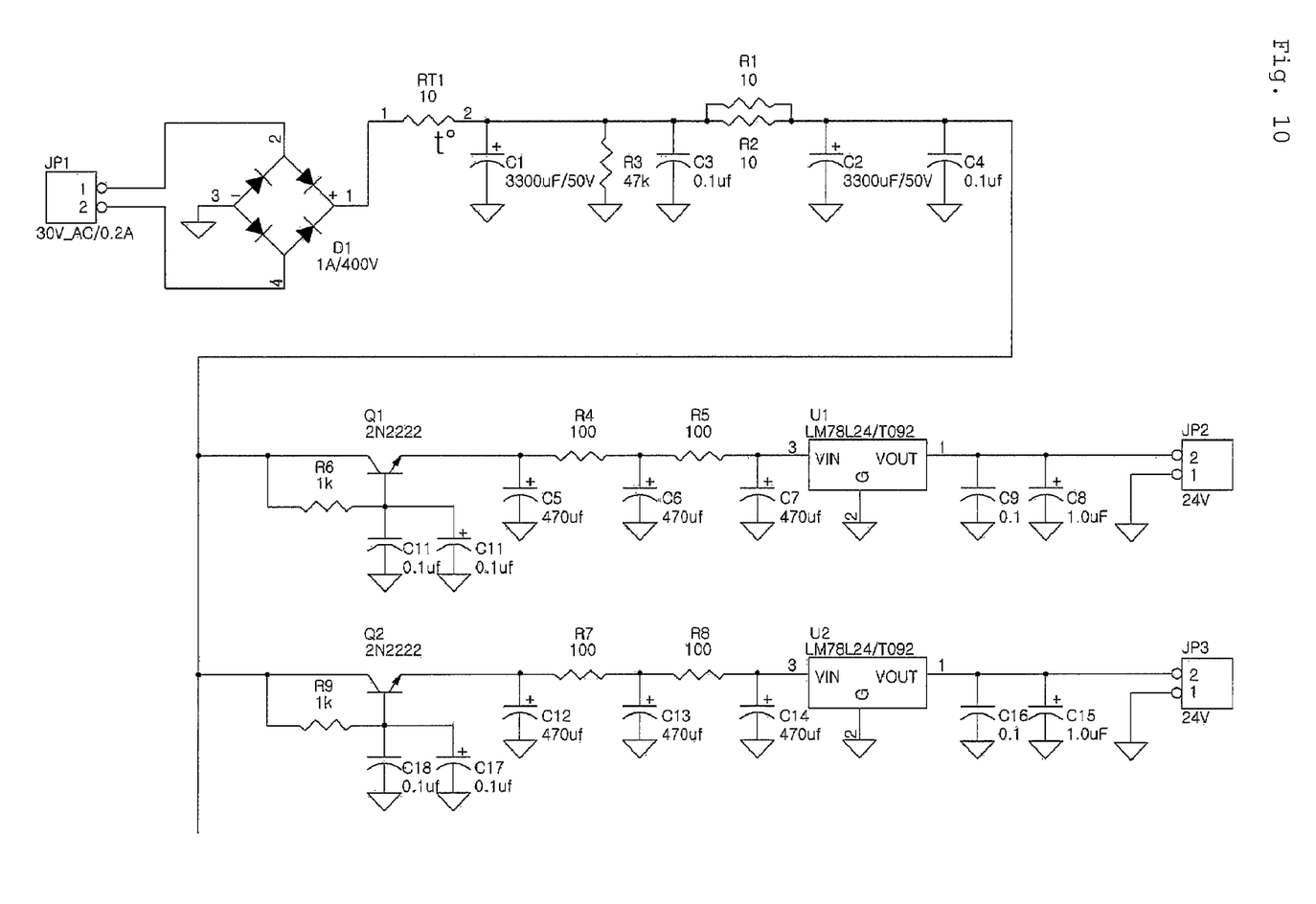
FIG. 10 is a circuit diagram showing a state that electric power is applied to an AE sensor.

The third embodiment relates to a set of the measuring apparatus with the AE sensor. FIG. 7 is a schematic view showing a construction in accordance with a third embodiment of the present invention, FIG. 8 is a circuit diagram showing a state that electric power is applied to an AE sensor, FIG. 9 is a conventional circuit diagram showing a state that electric power is applied to the AE sensor, and FIG. 10 is a circuit diagram showing a state that electric power is applied to an AE sensor.

The set of the measuring apparatus with the AE sensor of the third embodiment includes the measuring apparatus with the AE sensor of the first embodiment as a construction element.

Referring to FIG. 7, the set of the measuring apparatus with AE sensor used in the third embodiment of the present includes an AE/MS controller 210, an external power supply unit 220, a transmitter module 230, a receiver module 240 and a data sever 250.

Referring to FIG. 7, the AE/MS controller 210 is connected to each of the first and second AE sensors 121 and 122 of the measuring apparatus of the first embodiment. The AE/MS controller 210 functions to supply power to the first and second AE sensors 121 and 122 and also to receive the AE signals collected by the first and second AE sensors 121 and 122 and then measure, store and process them.

Referring to FIG. 7, the AE/MS controller 210 includes a signal conditioner 212, a data acquisition (DAQ) board 214 and a monitoring computer 216.

The signal conditioner 212 functions to supply the power to the first and second AE sensors 121 and 122 and receive the AE signals from the first and second AE sensors 121 and 122.

The AE sensor includes a piezoelectric sensor and a high sensitivity accelerometer. In the third embodiment, the high sensitivity accelerometer is used as the AE sensor. The power supplied to the high sensitivity accelerometers as the first and second AE sensors 121 and 122 has to be supplied in a way shown in FIG. 8. Since the first and second AE sensors 121 and 122 have a very high sensitivity of 30V/g, they are weak in noise of the power. Therefore, it is required to reduce the noise of the power supplied from the external power supply unit 220.

FIG. 9 shows a conventional circuit diagram in which the power is supplied to the AE sensors using SMPS (Switching Mode Power Supply). As shown in FIG. 9, when the power is applied to the AE sensors via, a 200 ohm resistor, the AE sensors are normally operated. However, if the power is supplied in a way shown in FIG. 9, a lot of noise is produced in the signals of the AE sensors, and the noise may be increased to 40 mV according to their environments. Further, in case of using multi-channels, if one channel receives a signal, the signal has an influence on other channels. This phenomenon is called 'crosstalk'. When using the SMPS, the crosstalk is occurred seriously.

FIG. 10 shows a circuit diagram showing a state that electric power is applied to an AE sensor in accordance with the third embodiment of the present invention. Referring to FIG. 10, the circuit diagram applied to the signal conditioner 212 includes a noise filtering circuit for removing the noise of the power generated when the power is applied to each of the AE sensors 121 and 122, a resistor row for preventing the crosstalk and voltage drop in each of the AE sensors 121 and 122, a condenser and a regulator.

That is, in the signal conditioner 212, the ripple of the power is removed by using a rectifying circuit and a smoothing circuit (integrating circuit) in an electric transformer. When the power is applied to the AE sensors 121 and 122, the noise filtering circuit is used to remove the noise, and the resistor row, condenser and regulator are used to prevent the voltage drop and the crosstalk.

By using the circuit, the noise level is reduced to 5 mV or less, and the crosstalk is also reduced in the same level so as to be not recognized.

Referring to FIG. 7, the external power supply unit 220 may include a solar panel and a battery 221 for supplying power to the AE/MS controller 210. Meanwhile, the external power unit 220 may also include a UPS as an auxiliary power supplying unit against interruption of electric power.

The DAQ board 214 functions to measure, store and process the AE signals transferred through the signal conditioner 212.

The monitoring computer 216 includes a monitor and an alarm unit. The alarm unit functions to give a warning when the failure of the geotechnical structure is predicted.

Referring to FIG. 7, the transmitter module 230 is connected with the AE/MS controller 210. The transmitter module 230 may be connected with the receiver module 240 through wireless, and the receiver module 240 is connected with the data server 250. The data server 250 functions to deduce a plurality of parameters showing the level of damage of the geotechnical structure from the AE signals received from the AE/MS controller 210 and then predict the level of damage and the failure of the geotechnical structure.

In the present invention, since the wave guide is divided into the outer waveguide and the inner waveguide, and the outer waveguide is formed of a brittle material, the measuring apparatus with the AE sensor can detect the same AE signals with respect to the same events that damage a geotechnical structure, regardless of conditions and shapes of the geotechnical structure, thereby collecting reliable AE signals and also precisely predicting the failure of the geotechnical structure. Therefore, the present invention can be widely used in estimating internal defects and damages of a structure including a tunnel, a bridge and the like.

Further, since the wave guide is divided into the outer waveguide and the inner waveguide, and the inner waveguide is formed of a metallic material, it is possible to reduce the attenuation of the AE signals in the wave guide.

Further, since the attenuating material is filled from the entrance to a desired depth of the borehole passing through an expected failure plane, it is possible to prevent the AE signals generated by the shock of the ground from being detected by the AE sensors.

Furthermore, since the signal conditioner for applying the power to the AE sensors employs a new type circuit, it is possible to prevent the noise of the power generated when the power is applied to the AE sensors and the voltage drop and the crosstalk in each AE sensors While the present invention has been described with respect to the specific embodiments, it will be apparent to those skilled in the art that various changes and modifications may be made without departing from the spirit and scope of the invention as defined in the following claims.

What is claimed is:

1. A measuring apparatus with an AE sensor, which is fixedly installed in a borehole passing through an expected failure plane of a geotechnical structure, comprising:
   an inner waveguide which is formed of a metallic material so as to prevent sharp attenuation of an AE signal;
   at least one AE sensor which is attached to the inner waveguide; and
   an outer waveguide which firmly encloses the inner waveguide and the at least one AE sensor, is formed of a homogeneous brittle material so as to generate specific AE signals according to movements of the geotechnical structure regardless of ground conditions in the geotechnical structure when the outer waveguide is damaged by the movements of the geotechnical structure.

2. The measuring apparatus of claim 1, wherein the outer waveguide is formed of cement.

3. The measuring apparatus of claim 2, wherein the outer waveguide is a grouting material formed by injecting the cement into the borehole after the inner waveguide on which the at least one AE sensor is attached is inserted into the borehole.

4. The measuring apparatus of any one of claims 1, 2 or 3, wherein the at least one AE sensor is attached to the inner waveguide by using an adhesive couplant so that elastic waves are smoothly propagated.

5. A set of the measuring apparatus with the AE sensor of any one of claims 1, 2 or 3, comprising:
   an AE/MS controller which supplies power to each AE sensor and also functions to receive the AE signals collected by each AE sensors and then measure, store and process them;
   an external power supply unit which supplies power to the AE/MS controller; and
   a data server which is connected with the AE/MS controller.

6. The set of claim 5, wherein the AE/MS controller comprises a signal conditioner which functions to supply the power to each AE sensor and also to receive AE signals from the AE sensor, wherein the signal conditioner comprises a noise filtering circuit for removing power noise generated when the power is supplied to each AE sensor; a resistor row, a condenser and a regulator which prevents voltage drop and crosstalk in each AE sensor.

7. An installing method of a measuring apparatus with an AE sensor, comprising:
   an installing step of an inner waveguide wherein an inner waveguide, on which at least one AE sensor is attached and which is formed of a metallic material to prevent sharp attenuation of a AE signal, is inserted into a borehole passing through an expected failure plane in a geotechnical structure, and an upper end of the inner waveguide positioned at a desired depth from an entrance of the borehole that is intended to fill attenuating materials in space between the end of the inner waveguide and the entrance of the borehole to prevent detection of any noises which are occurred by any ground impact;
   a grouting step wherein cement is grouted in a space between the inner waveguide and the borehole, being grouted onto an upper end of the inner waveguide, so as to generate specific AE signals according to movements of the geotechnical structure regardless of ground conditions in the geotechnical structure when the cement, which is attached to an outer side of the inner waveguide, is damaged by the movements of the geotechnical structure; and
   a filling step of an attenuating material wherein an attenuating material is filled from an upper side of the cement to the entrance of the borehole.

8. The method of claim 7, wherein the installing step of an inner waveguide is performed by loosening a string which is formed of a non-metallic material and connected with the outer end of the inner waveguide.

9. The method of claim 8, wherein the installing step of an inner waveguide is performed so that the AE sensors are respectively positioned at a different place while the expected failure plane is interposed between the AE sensors.

10. The method of any one of claims 7 to 9, wherein the attenuating material is sand.

\* \* \* \* \*